(12) United States Patent
Lee et al.

(10) Patent No.: US 8,896,205 B1
(45) Date of Patent: Nov. 25, 2014

(54) QUARTZ LIGHT

(71) Applicants: AMC Automation Co., Ltd., Sinju (TW); San Fong Machinery Enterprise Co., Ltd., Sinju (TW)

(72) Inventors: Chih Cheng Lee, Sinju (TW); John J. C. Lin, Sinju (TW)

(73) Assignees: AMC Automation Co., Ltd., Sinpu, Sinju (TW); San Fong Machinery Enterprise Co., Ltd., Sinpu, Sinju (TW)

( * ) Notice: Subject to any disclaimer, the term of this patent is extended or adjusted under 35 U.S.C. 154(b) by 0 days.

(21) Appl. No.: 14/057,264

(22) Filed: Oct. 18, 2013

(51) Int. Cl.
*H01J 17/18* (2012.01)
*H01J 61/36* (2006.01)

(52) U.S. Cl.
CPC .................................. *H01J 61/366* (2013.01)
USPC .......................................... 313/623; 313/624

(58) Field of Classification Search
USPC ....................................................... 313/623
See application file for complete search history.

(56) References Cited

U.S. PATENT DOCUMENTS

| | | | |
|---|---|---|---|
| 4,099,081 A | | 7/1978 | Ainsworth |
| 4,305,015 A | * | 12/1981 | Honda et al. .................. 313/113 |
| 4,361,779 A | | 11/1982 | van der Steen et al. |
| 4,385,257 A | | 5/1983 | Fitzgerald |
| 4,533,851 A | | 8/1985 | Block et al. |
| 5,164,630 A | * | 11/1992 | Greiler et al. .................... 313/25 |
| 5,572,091 A | * | 11/1996 | Langer et al. ................. 313/636 |
| 6,611,102 B2 | | 8/2003 | Kimoto et al. |
| 6,628,081 B2 | * | 9/2003 | Behr et al. ....................... 315/56 |
| 6,958,575 B2 | * | 10/2005 | Dombrowski et al. ....... 313/489 |
| 2002/0163288 A1 | * | 11/2002 | Behr et al. ............... 313/318.01 |

\* cited by examiner

*Primary Examiner* — Mary Ellen Bowman
(74) *Attorney, Agent, or Firm* — Charles E. Baxley

(57) ABSTRACT

A quartz light includes a lamp base having two grooves, and a light capsule located above the lamp base and having a projection disposed in a compartment of the light capsule, a metal electrode engaged in the compartment of the light capsule and engaged over the projection for forming two downwardly dependent limbs, two molybdenum foils engaged in the compartment of the light capsule and electrically connected to the limbs of the metal electrode, and two lead wires electrically coupled to the molybdenum foils and each having an external end portion extended out of the light capsule and engaged through the grooves of the lamp base and extended out of the lamp base, and secured to the lamp base by heat sealing the lamp base onto the lead wires.

4 Claims, 3 Drawing Sheets

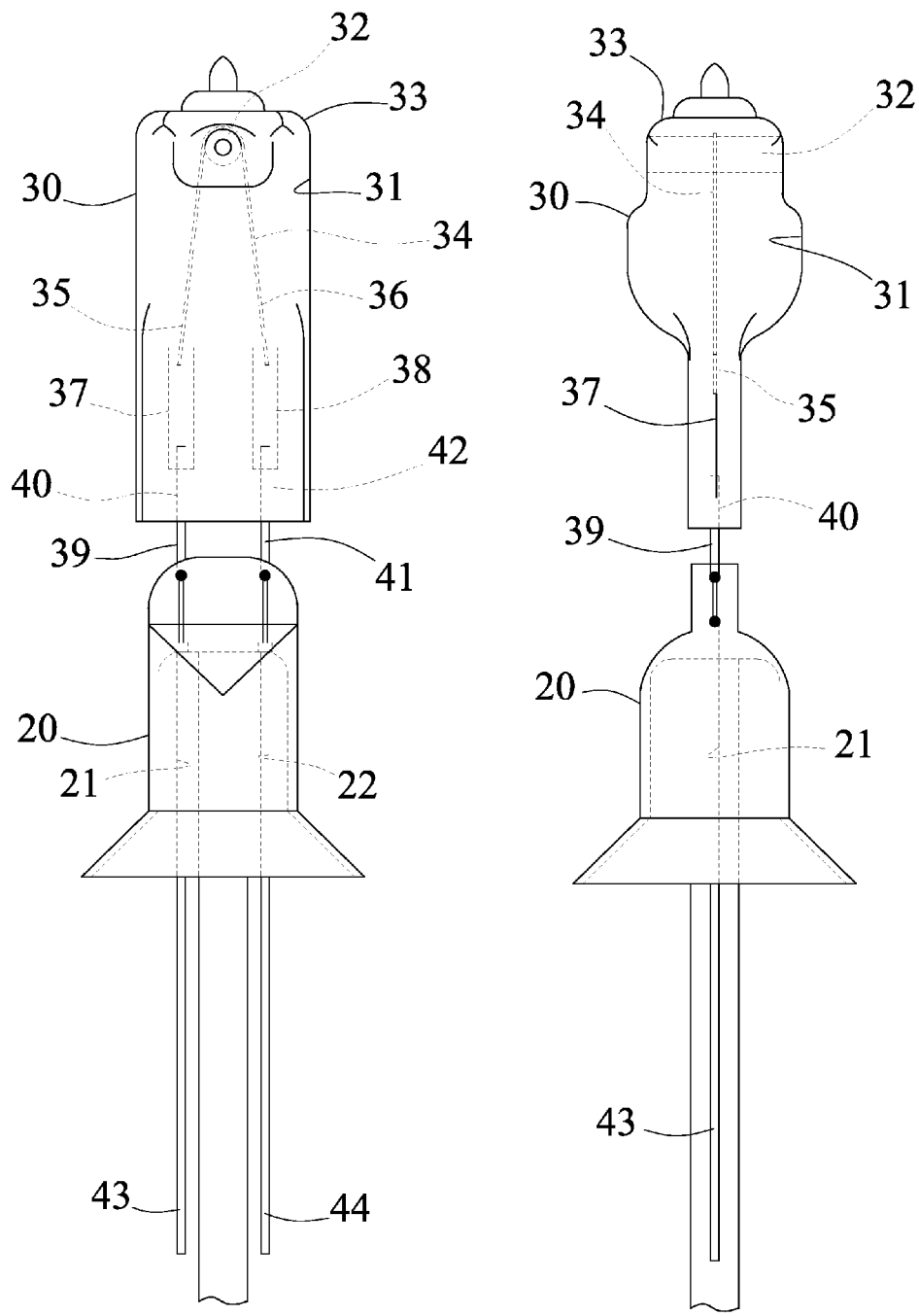
F I G. 2   F I G. 3

QUARTZ LIGHT

BACKGROUND OF THE INVENTION

1. Field of the Invention

The present invention relates to a quartz or crystal light or lamp, and more particularly to a quartz or crystal light or lamp including a light capsule having an improved structure or configuration for preventing the light capsule from being made or manufactured with welding procedures and for decreasing or simplifying the making or manufacturing procedures for the light capsule.

2. Description of the Prior Art

Various kinds of typical quartz or crystal lights or lamps have been developed and comprise a light bulb or vitreous envelope or hard glass envelope or light envelope or light capsule provided for generating a light, and including a number of electrodes or lead wires or conductors that are required to be welded or secured together with spot welds or the like.

For example, U.S. Pat. No. 4,099,081 to Ainsworth, U.S. Pat. No. 4,305,015 to Honda et al., U.S. Pat. No. 4,361,779 to van der Steen et al., U.S. Pat. No. 4,385,257 to Fitzgerald, U.S. Pat. No. 4,533,851 to Block et al., U.S. Pat. No. 5,572,091 to Langer et al., and U.S. Pat. No. 6,611,102 to Kimoto et al. disclose several of the typical quartz or crystal lights or lamps each also comprising a light bulb or vitreous envelope or hard glass envelope or light envelope or light capsule including a number of electrodes or lead wires or conductors provided or disposed or engaged in the light capsule for receiving an electric energy to generate a light.

However, normally, some of the electrodes or lead wires or conductors are required to be welded or secured together with spot welds or the like, and the spot welds or the like may be easily and quickly worn out or damaged due to high temperature such that the working life of the typical quartz or crystal lights or lamps is always short.

The present invention has arisen to mitigate and/or obviate the afore-described disadvantages of the conventional quartz lights or lamps.

SUMMARY OF THE INVENTION

The primary objective of the present invention is to provide a quartz light including a light capsule having an improved structure or configuration for preventing the light capsule from being made or manufactured with welding procedures and for decreasing or simplifying the making or manufacturing procedures for the light capsule.

The other objective of the present invention is to provide a quartz light including a light capsule having an improved structure or configuration and having fewer parts or elements that may be easily assembled with less working hours.

In accordance with one aspect of the invention, there is provided a quartz light comprising a lamp base including two grooves formed therein, and a light capsule located above the lamp base, and the light capsule including a compartment formed therein, and including a projection provided in the compartment of the light capsule, a metal electrode engaged in the compartment of the light capsule and engaged over the projection for forming two downwardly dependent limbs, two molybdenum foils engaged in the compartment of the light capsule and electrically connected to the limbs of the metal electrode respectively, and two lead wires each including an inner end portion engaged into the compartment of the light capsule and electrically coupled to the molybdenum foils respectively, and each including an external end portion extended out of the light capsule and engaged through the grooves of the lamp base respectively and extended out of the lamp base.

The projection is preferably located in an upper portion of the light capsule. The external end portions of the lead wires are secured to the lamp base by heat sealing the lamp base onto the lead wires.

A light bulb may further be provided and includes two metal fittings provided thereon, and the external end portions of the lead wires being electrically connected to the metal fittings of the light bulb respectively.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is a partial front plan schematic view of the quartz light;

FIG. 3 is a partial side plan schematic view of the quartz light; and

DETAILED DESCRIPTION OF THE PREFERRED EMBODIMENT

Figure 1:
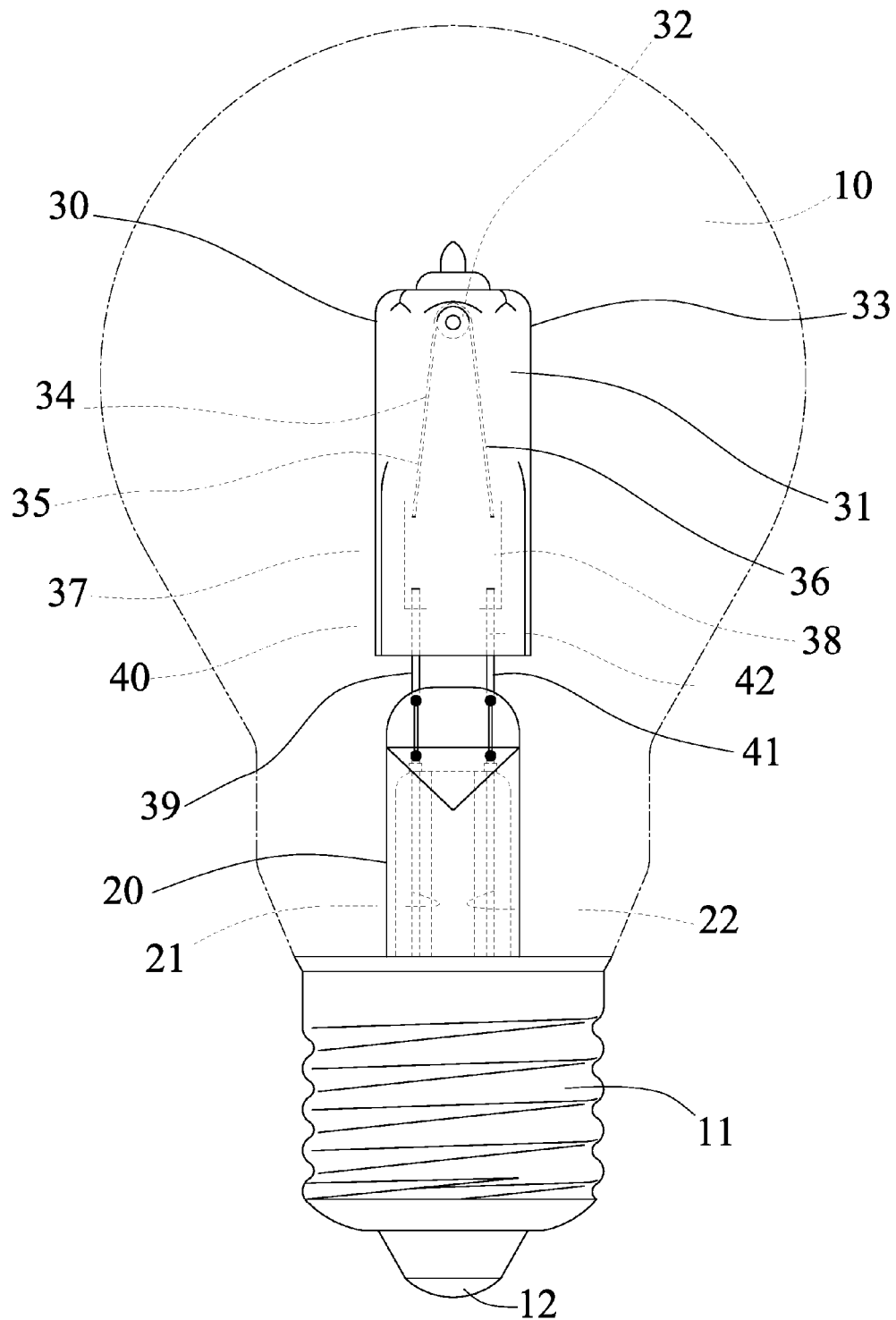
FIG. 1 is a front plan schematic view of a quartz light in accordance with the present invention.

Referring to the drawings, and initially to FIGS. 1-3, a quartz light in accordance with the present invention comprises an outer housing or receptacle or light bulb 10 including two metal fittings 11, 12 formed or provided on the lower or bottom portion thereof for electrically connecting or coupling to the light sockets (not illustrated) or the like, and the light bulb 10 and the metal fittings 11, 12 are typical and are not related to the present invention and will not be described in further details, and the quartz light further comprises a ceramic base or lamp base 20 disposed or engaged in the light bulb 10, in which the lamp base 20 includes two envelope or capsule receiving or engaging slots or socket openings or grooves 21, 22 formed therein.

The quartz light further comprises a hard glass envelope or light envelope or light capsule 30 disposed or engaged or provided in the light bulb 10 and disposed or located above the lamp base 20, and the light capsule 30 includes a chamber or seal portion or compartment 31 formed therein, and includes a hanger peg or rod or member or projection 32 formed or provided or disposed or engaged in the compartment 31 of the light capsule 30 and located in the upper portion 33 of the light capsule 30, and a filament or refractory metal conductor or electrode 34 also provided or disposed or engaged in the compartment 31 of the light capsule 30 and engaged around or over the hanger projection 32 for forming or defining two downwardly dependent legs or limbs 35, 36.

Figure 4:
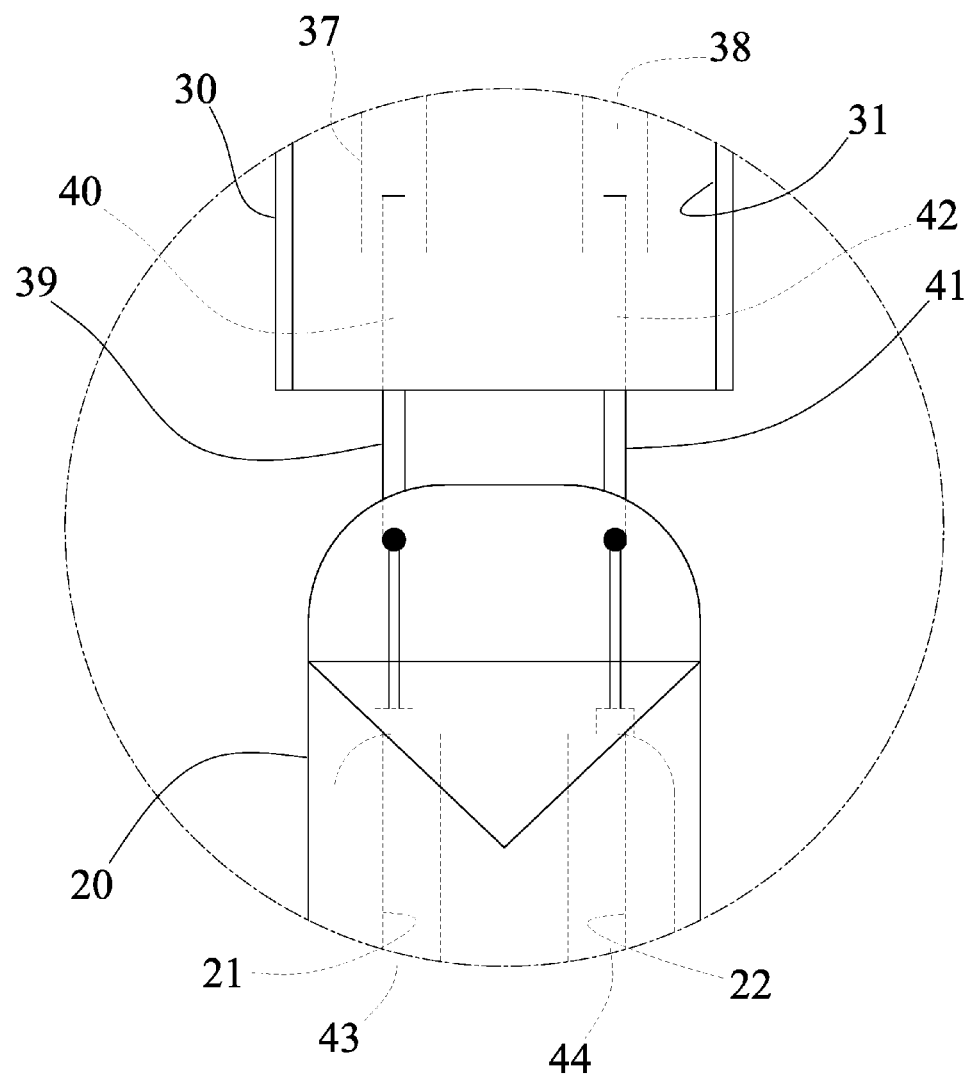
FIG. 4 is an enlarged partial front plan schematic view of the quartz light.

The light capsule 30 further includes two molybdenum ribbons or foils 37, 38 also provided or disposed or engaged in the compartment 31 of the light capsule 30 and electrically connected or coupled to the limbs 35, 36 of the refractory metal electrode 34 respectively, and two outer or external lead wires 39, 41, the lead wires 39, 41 each include an upper or inner end portion 40, 42 extended or engaged into the compartment 31 of the light capsule 30 (FIG. 4) and electrically connected or coupled to the molybdenum foils 37, 38 respectively, and each include an outer or free or external end portion 43, 44 extended out of the light capsule 30 and engaged into or through the grooves 21, 22 of the lamp base 20 respectively and extended out of the lamp base 20 and electrically connected or coupled to the metal fittings 11, 12 of the light bulb 10 respectively.

It is to be noted that, as shown in FIGS. 1-4, the lead wires 39, 41, particularly, the external end portions 43, 44 of the lead wires 39, 41 that are engaged into or through the grooves 21, 22 of the lamp base 20 may be easily and quickly and readily and solidly and stably attached or mounted or secured or anchored or retained in the lamp base 20 by melting or hot-pressing or heat sealing the lamp base 20 onto the lead wires 39, 41 without welding procedures, for allowing the making or manufacturing procedures for the quartz light to be decreased or reduced or simplified. The quartz light includes a light capsule having an improved structure or configuration and having fewer parts or elements that may be easily assembled with less working hours.

Accordingly, the quartz light in accordance with the present invention includes a light capsule having an improved structure or configuration for preventing the light capsule from being made or manufactured with welding procedures and for decreasing or simplifying the making or manufacturing procedures for the light capsule, and having fewer parts or elements that may be easily assembled with less working hours.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A quartz light comprising:
a lamp base including two grooves formed therein, and
a light capsule located above said lamp base, and said light capsule including a compartment formed therein, and including a projection provided in said compartment of said light capsule,
a metal electrode engaged in said compartment of said light capsule and engaged over said projection for forming two downwardly dependent limbs,
two molybdenum foils engaged in said compartment of said light capsule and electrically connected to said limbs of said metal electrode respectively, and
two lead wires each including an inner end portion engaged into said compartment of said light capsule and electrically coupled to said molybdenum foils respectively, and each including an external end portion extended out of said light capsule and engaged through said grooves of said lamp base respectively and extended out of said lamp base.

2. The quartz light as claimed in claim 1, wherein said projection is located in an upper portion of said light capsule.

3. The quartz light as claimed in claim 1, wherein said external end portions of said lead wires are secured to said lamp base by heat sealing said lamp base onto said lead wires.

4. The quartz light as claimed in claim 1 further comprising a light bulb including two metal fittings provided thereon, and said external end portions of said lead wires being electrically connected to said metal fittings of said light bulb respectively.

\* \* \* \* \*